April 30, 1963     O. W. SEPP, JR     3,087,696
PERSONNEL PARACHUTE PACK
Filed Nov. 1, 1960     14 Sheets-Sheet 1
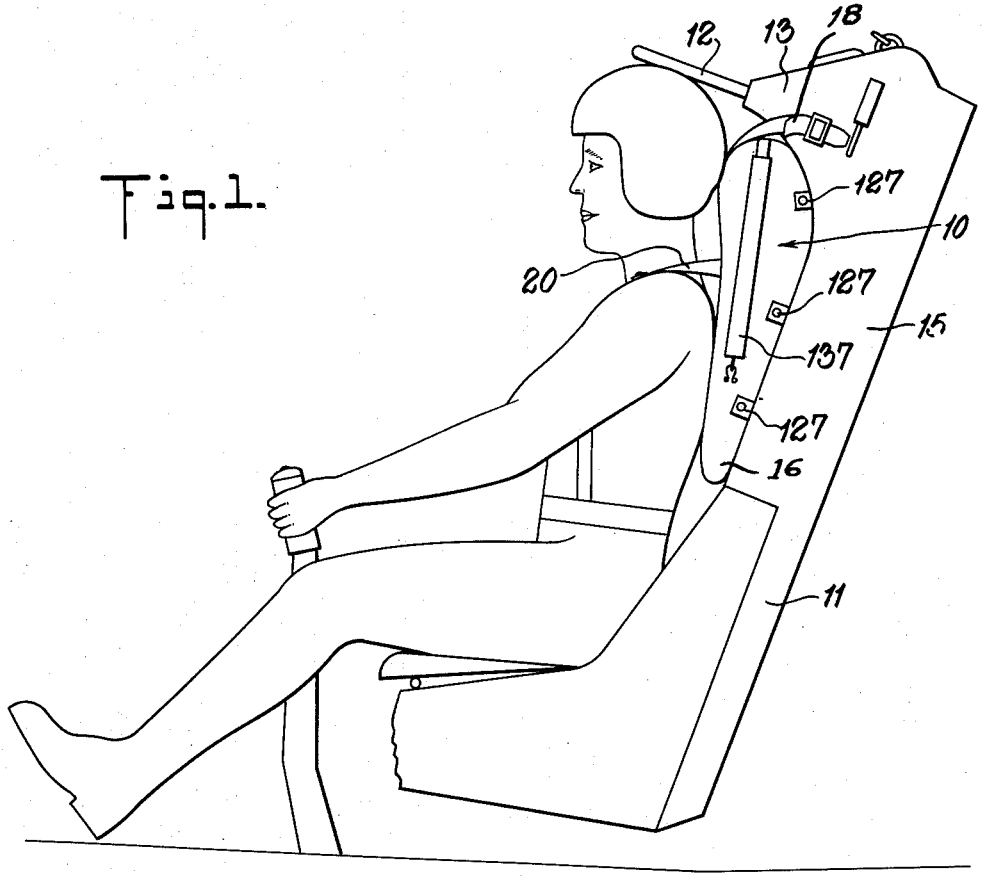
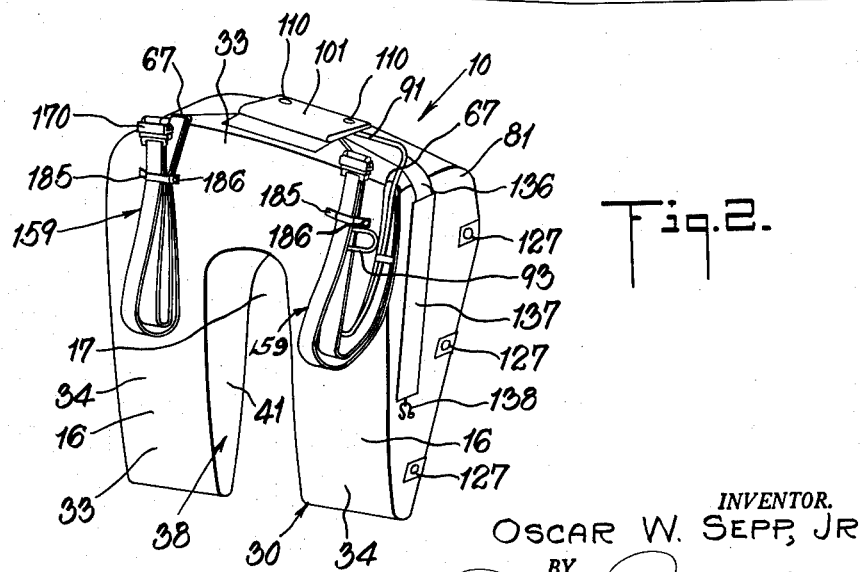
INVENTOR.
OSCAR W. SEPP, JR
BY
Burgess, Ryan & Hicks
ATTORNEYS

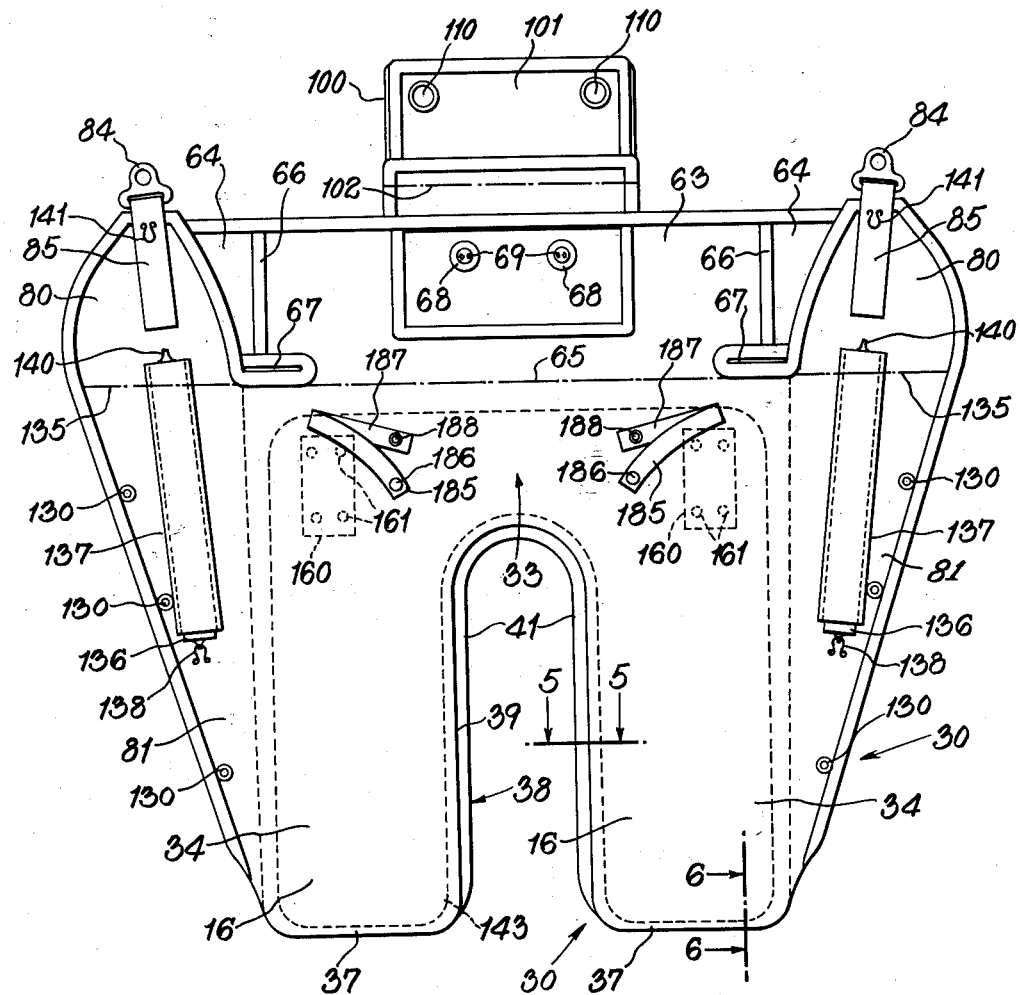

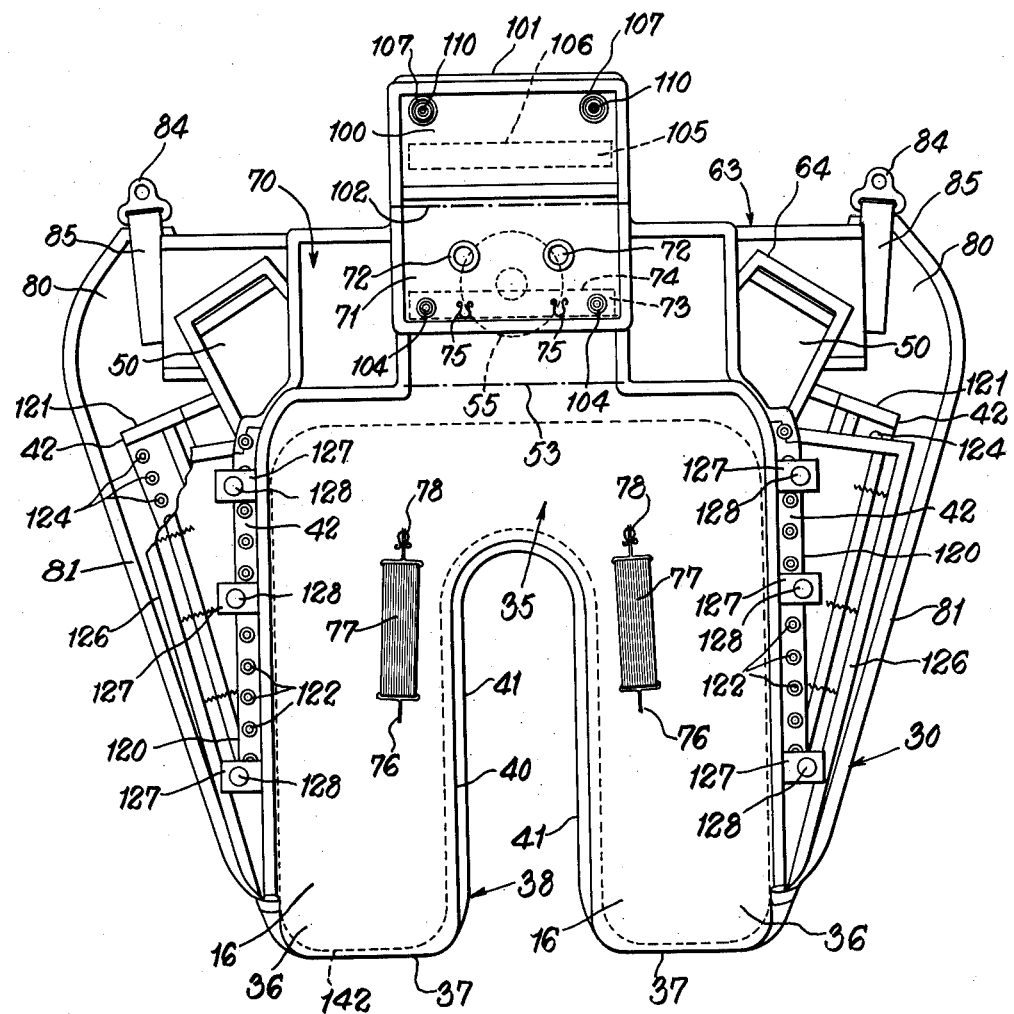

INVENTOR.
OSCAR W. SEPP, JR.
ATTORNEYS

April 30, 1963     O. W. SEPP, JR     3,087,696
PERSONNEL PARACHUTE PACK
Filed Nov. 1, 1960     14 Sheets-Sheet 5
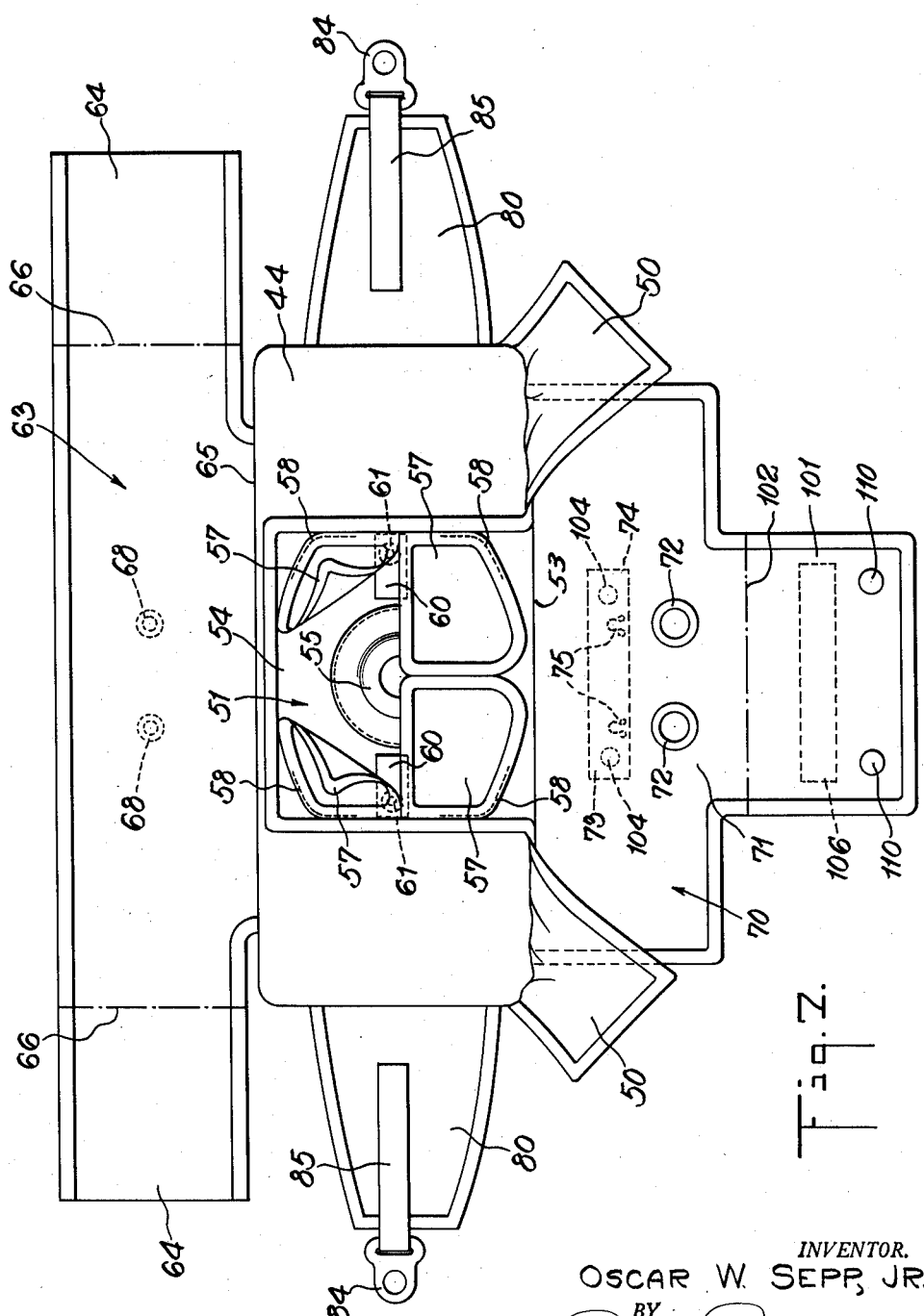
INVENTOR.
OSCAR W. SEPP, JR.
BY
Burgess, Ryan, Hicks
ATTORNEYS

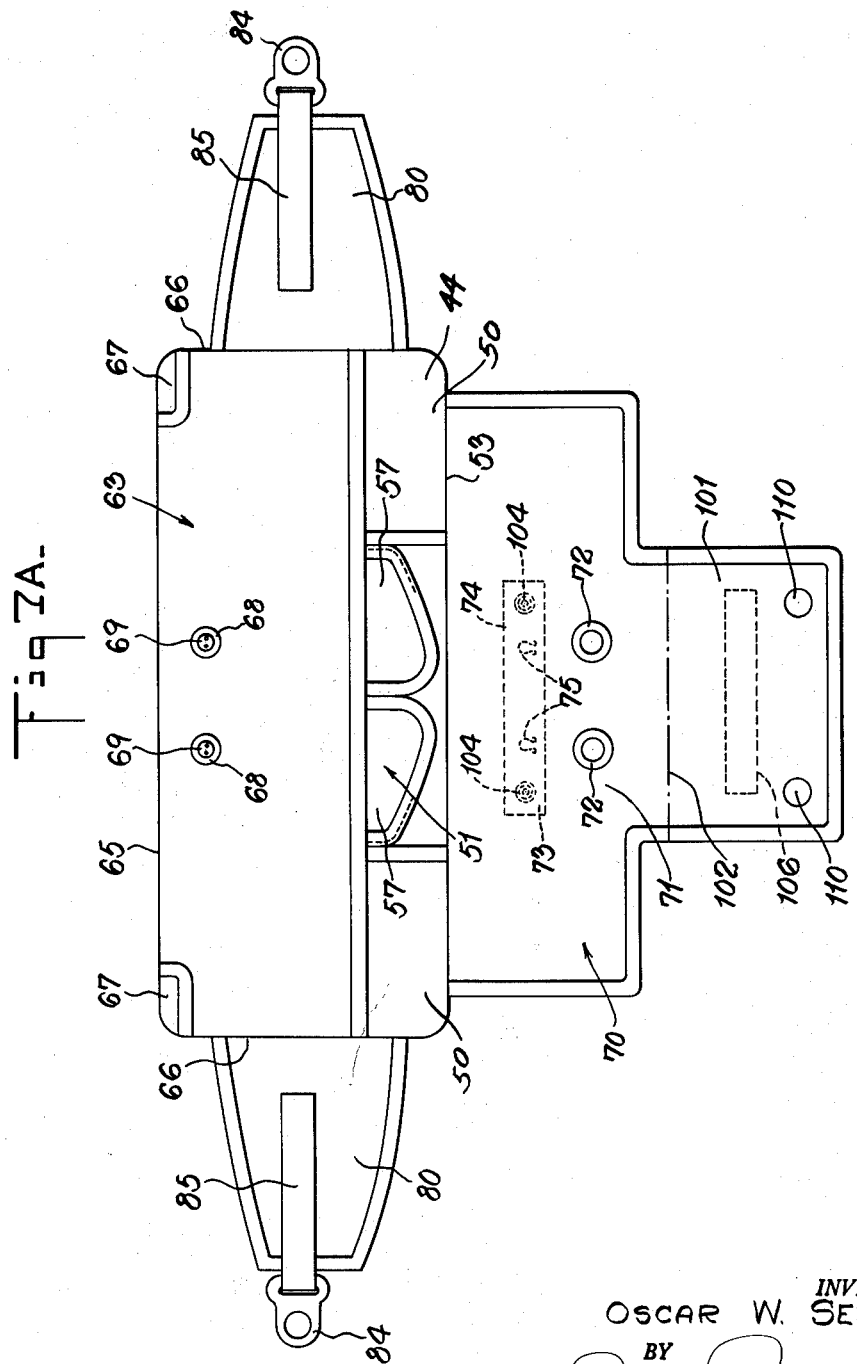

April 30, 1963 O. W. SEPP, JR 3,087,696
PERSONNEL PARACHUTE PACK
Filed Nov. 1, 1960 14 Sheets-Sheet 7
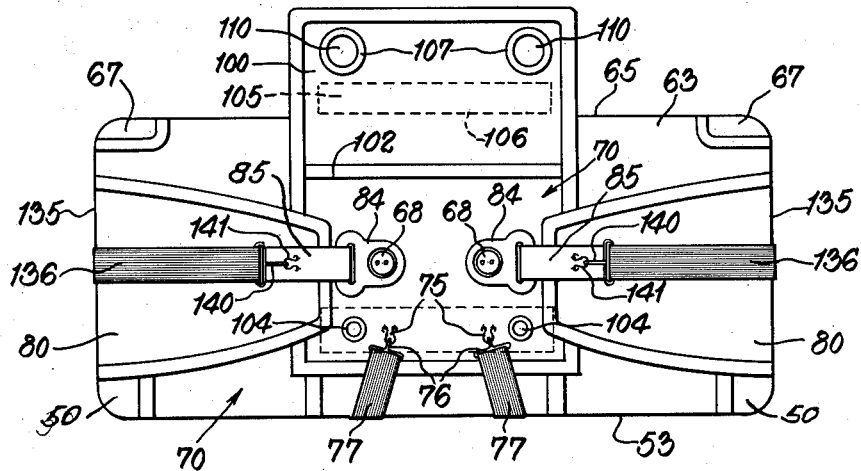
Fig. 8.
Fig. 9.
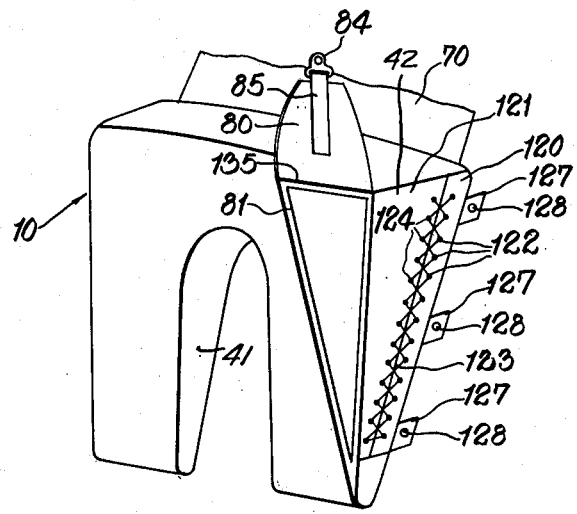
INVENTOR.
OSCAR W. SEPP, JR.
BY
ATTORNEYS

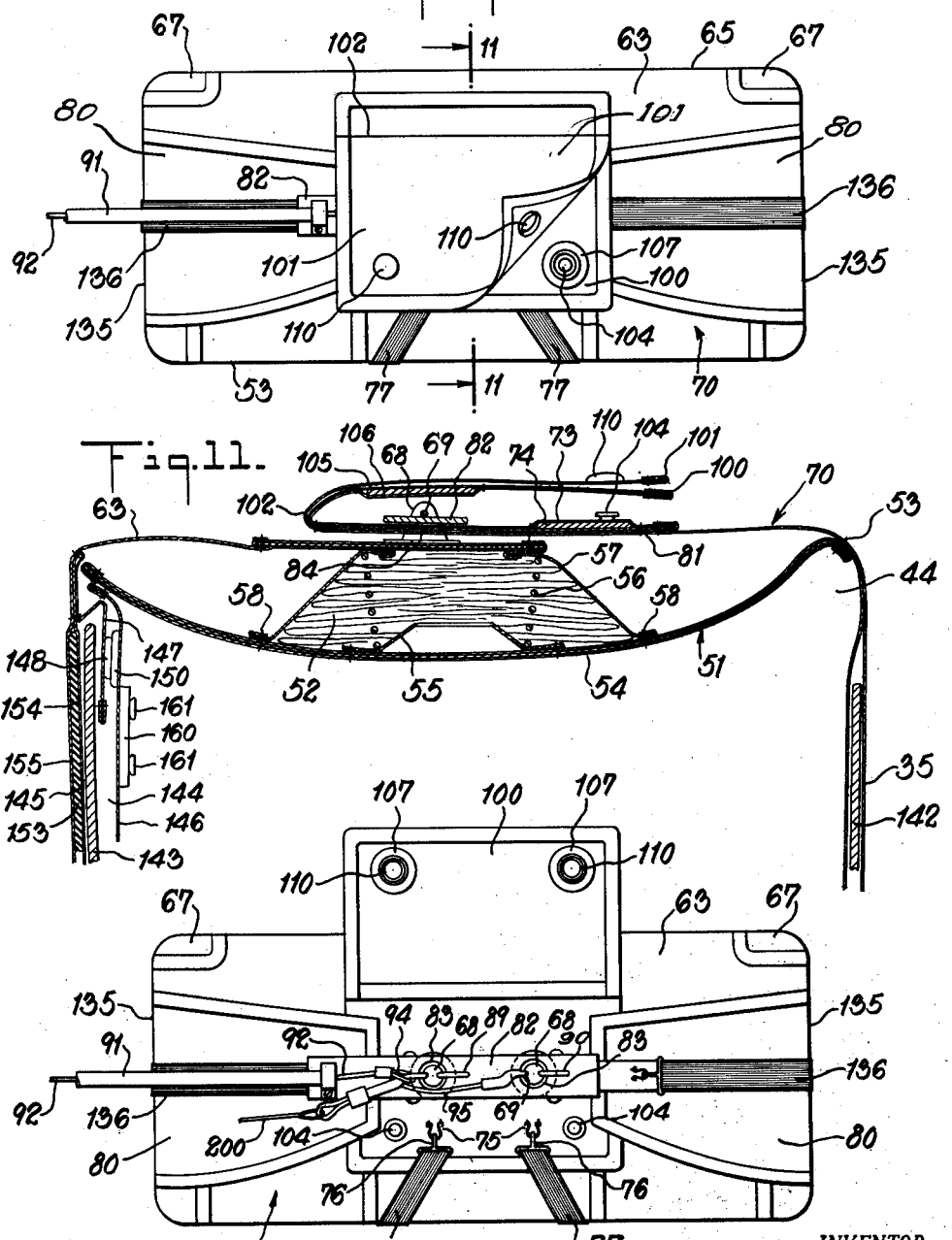

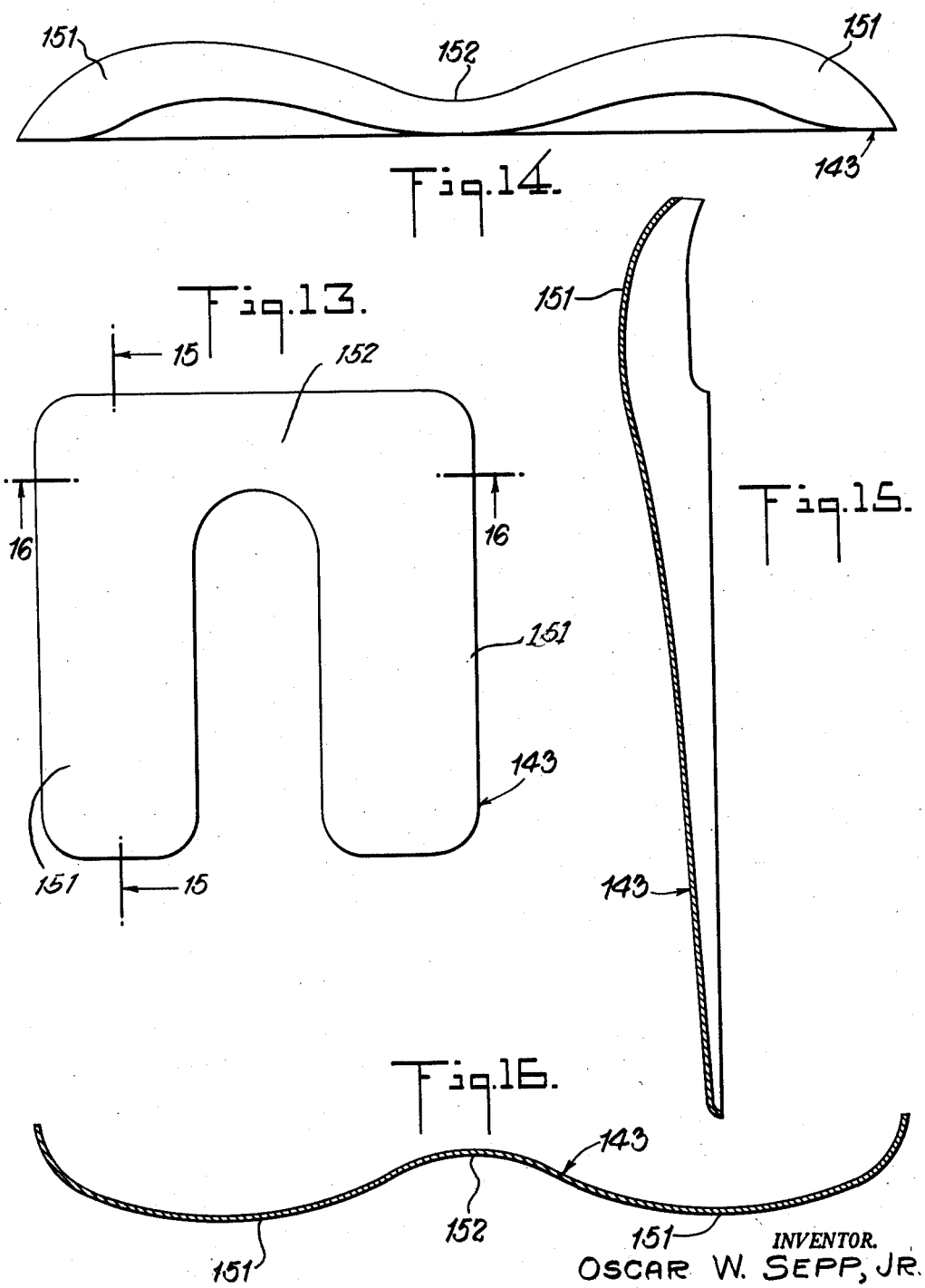

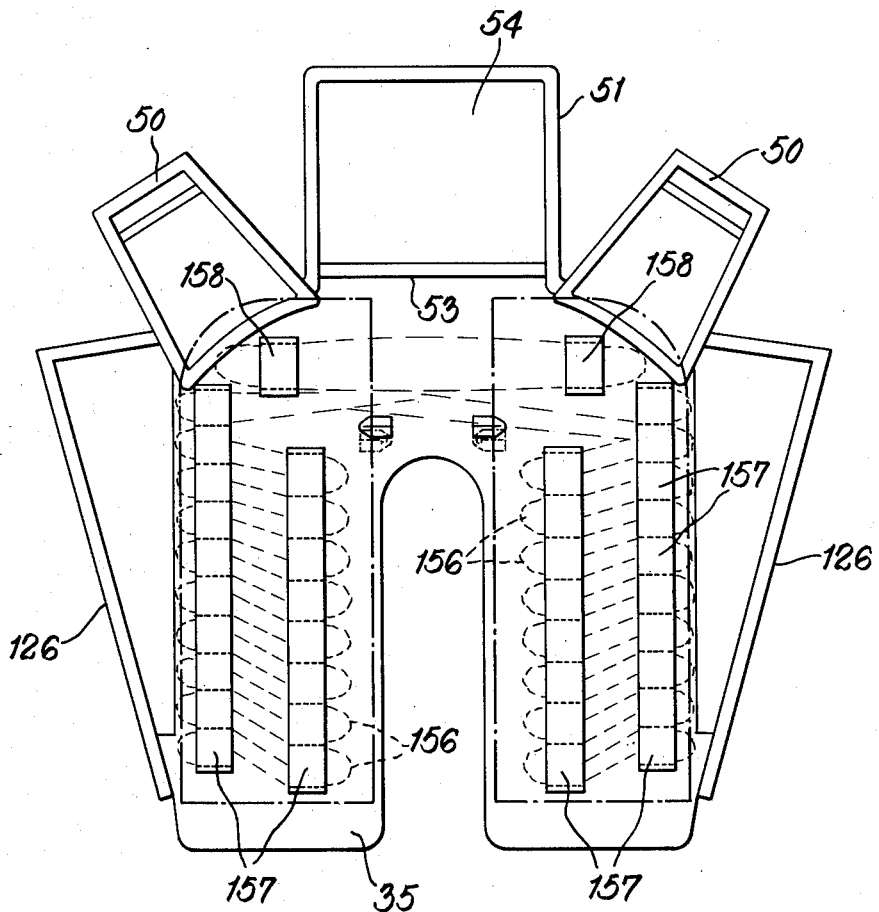

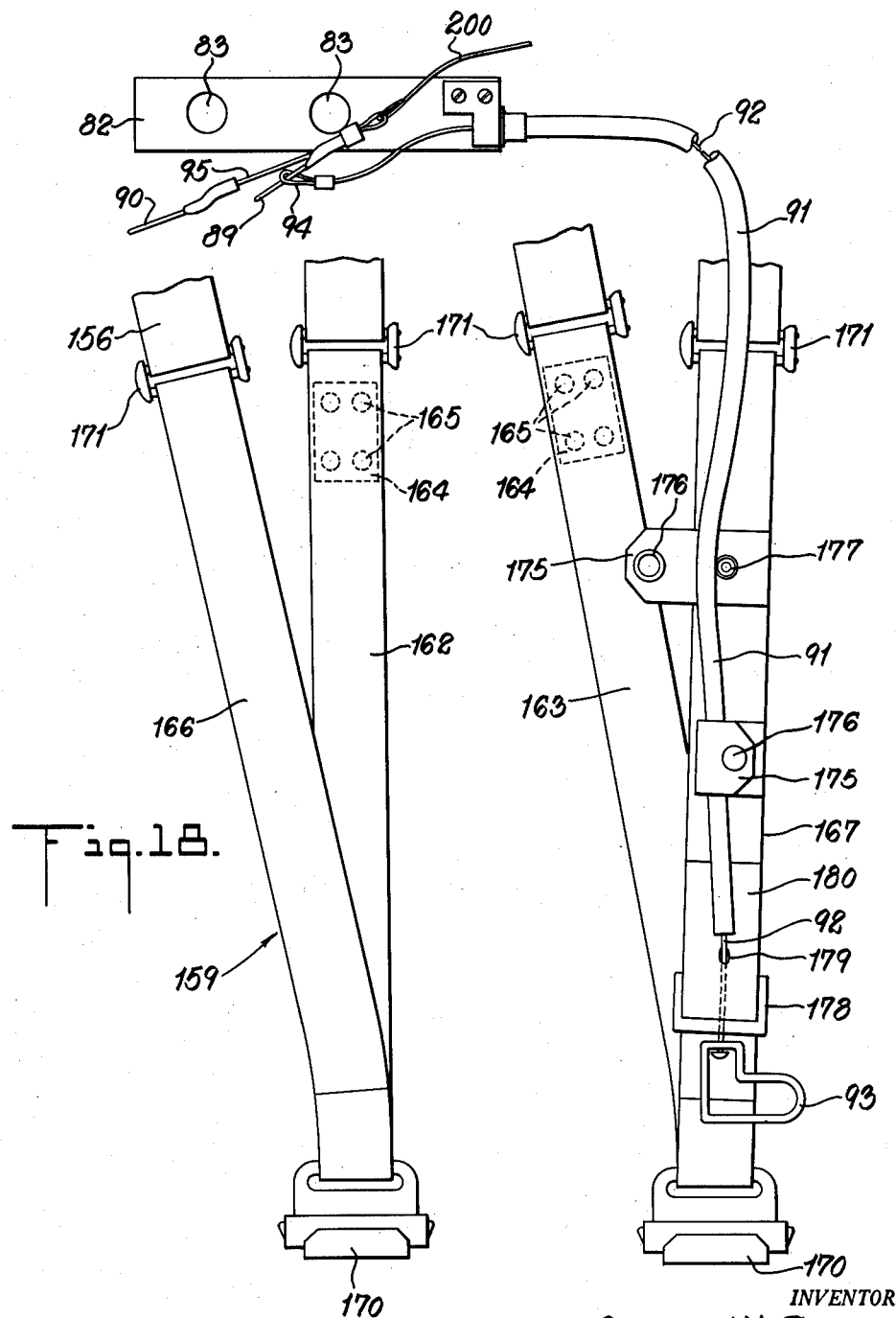

April 30, 1963 — O. W. SEPP, JR — 3,087,696
PERSONNEL PARACHUTE PACK
Filed Nov. 1, 1960 — 14 Sheets-Sheet 12

INVENTOR.
OSCAR W. SEPP, JR.
BY
ATTORNEYS

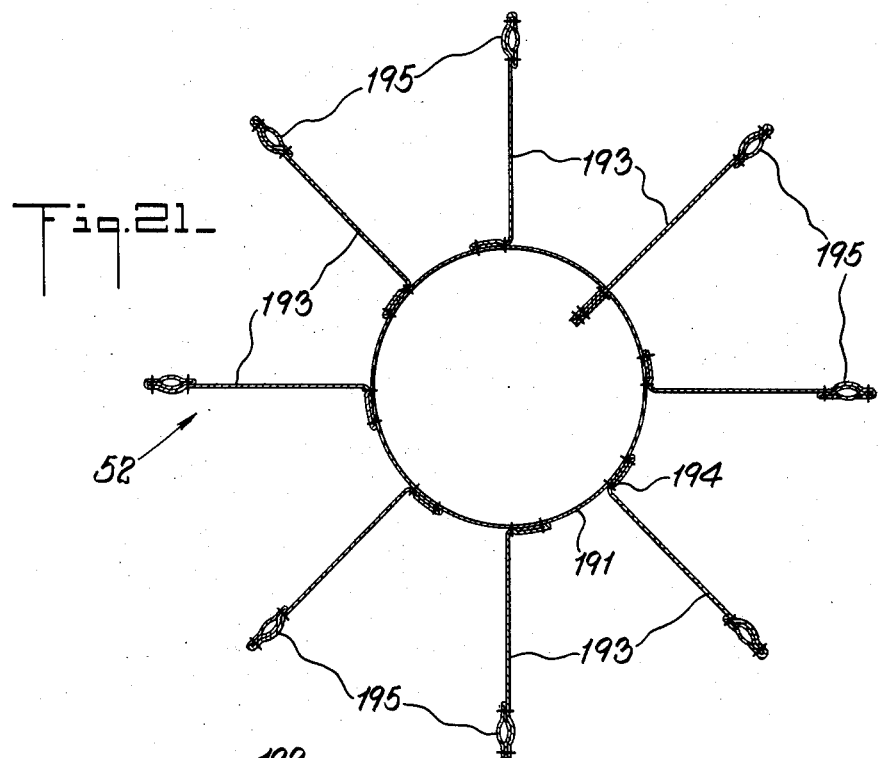
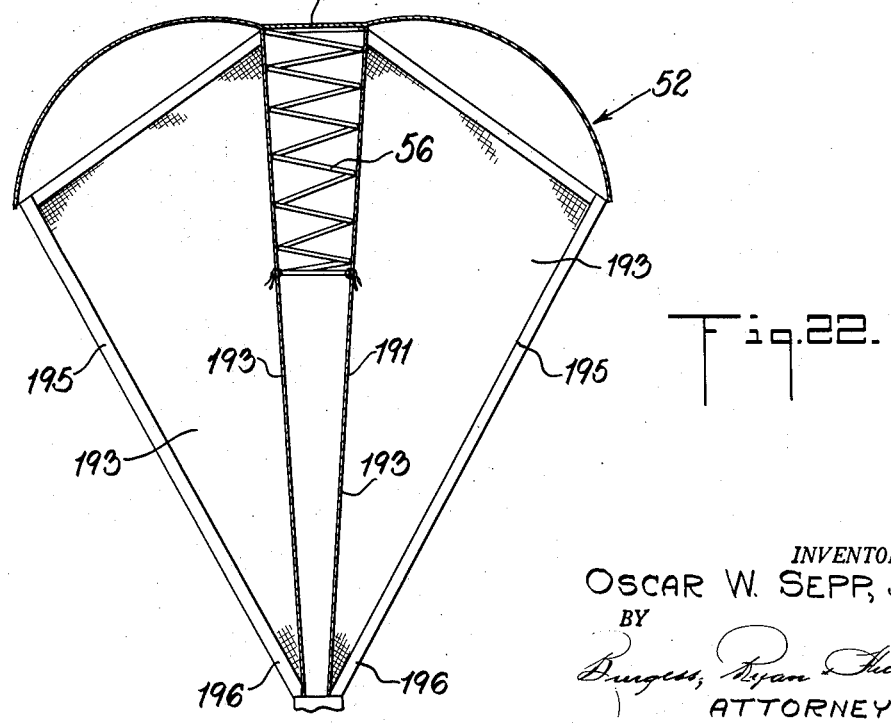

April 30, 1963     O. W. SEPP, JR     3,087,696
PERSONNEL PARACHUTE PACK
Filed Nov. 1, 1960     14 Sheets-Sheet 14

INVENTOR.
OSCAR W. SEPP, JR.
BY
Burgess, Ryan & Hicks
ATTORNEYS

United States Patent Office 3,087,696
Patented Apr. 30, 1963

3,087,696
PERSONNEL PARACHUTE PACK
Oscar W. Sepp, Jr., Merrick, N.Y., assignor to M. Steinthal & Co., Inc., New York, N.Y., a corporation of New York
Filed Nov. 1, 1960, Ser. No. 66,616
16 Claims. (Cl. 244—148)

The present invention relates to an aircraft pack assembly for a personnel parachute and to the components of such an assembly.

In an aircraft seat ejection system, such as that known as the Martin-Baker seat ejection system, upon emergency, the seat with the airman thereon is ejected from the aircraft by an ejection gun operating between the seat frame and a fixed part of the aircraft. When the seat is ejected from the aircraft, a drogue parachute is deployed automatically by a drogue gun fired either by the tension on a cable or static line connecting the ejected seat to the aircraft or by a time delay mechanism which is set in motion as the seat leaves the cockpit of the aircraft. This drogue parachute steadies and retards the ejected seat. Upon operation of a manual or automatic release, the airman is separated from the ejected seat and at about the same time, a personnel parachute is withdrawn by the drogue parachute from a pack causing the airman, free of the seat, to descend in the normal way under the retarding influence of the personnel parachute.

One object of the present invention is to provide a new and improved personnel parachute pack assembly of the type containing a pilot chute and a main parachute.

A further object of the present invention is to provide a new and improved personnel parachute pack assembly in which the main parachute and the pilot chute are stowed in a case in such a way as to maintain them neatly and separately in different compartments of the case without being disturbed even under rough handling, and which can be deployed from the case successively and orderly in a predetermined manner with a simple manipulation by the airman, without the possibility of entanglement.

A further object of the present invention is to provide a new and improved case for a personnel parachute pack assembly made of flexible fabric reinforced and stiffened to provide a strong rigid unit defining two stowage compartments of somewhat predetermined form and shape, designed to house therein a main parachute and a pilot chute respectively and to maintain their set arrangements therein without disturbance under the most severe conditions until these parachutes are released.

A further object of the present invention is to provide a new and improved case for a personnel parachute, which is adjustable into enlarged condition to permit easy handling thereof during the process of stowing and arranging the main parachute therein and which is adjustable into reduced condition to compress the pack into a compact unit of somewhat predetermined size and shape after the main parachute has been stowed in the case and to confine snugly the stowed parachute against disarrangement in the case.

Another object of the present invention is to provide a new and improved case for a personnel parachute pack, which can be rendered generally flexible during the assembling stage of stowing the main parachute therein to afford ease and convenience of assembling during this stage and which can be stiffened after this stowing stage to impart form sustaining rigidity to the case.

A further object of the present invention is to provide a new and improved personnel parachute pack assembly, which has a case with compartment means for stowing the pilot chute separately from the main parachute, and closure means for said case designed to hold and protect certain releasable components of the assembly including the pilot chute safely and assuredly, and which is designed to cause the quick and certain operation of the closure means into open position to release the pilot chute and to cause the pilot chute at the same time to be impelled from the case compartment quickly and with certainty upon manipulation of the necessary control.

Another object of the invention is to provide a personnel pack assembly having new and improved means for supporting a spring-ejectable pilot chute in a compartment of the pack case in centered stabilized predetermined position and in such a way as to assure its ejection therefrom in a predetermined direction in relation to the case.

Various other objects of the invention are apparent from the following description and from the accompanying drawings, in which FIG. 1 is a diagrammatic side view showing the assembled personnel parachute pack of the present invention in connection with an aircraft ejection seat, as for example, of the Martin-Baker type;

FIG. 2 is a perspective of the assembled personnel parachute pack embodying the present invention;

FIG. 3 is a front view of the personnel parachute pack embodying the present view and shown in fully open position including the covers for its side panels;

FIG. 4 is a rear view of the personnel parachute pack embodying the present view and shown in fully open position including its side panels and the covers for these panels;

FIG. 7 is a top plan view of the personnel pack with all of the upper flaps shown in open position and the pilot chute container shown empty before the pilot chute has been stowed therein and folded down over the main parachute compartment;

FIG. 7a is a top plan view of the personnel parachute pack in an early stage of assembly and shown with the pilot chute stowed in its container and folded down over the main parachute compartment, and an inner closure flap folded down over the pilot chute container;

FIG. 8 is a top plan view of the personnel parachute pack shown in a later stage of assembly with an outer closure flap folded down over the inner closure flap, and side flaps forming upper extensions of side panel covers folded down over said closure and flaps having clip ring engagements with locking posts on said closure flap;

FIG. 9 is a perspective of the personnel parachute pack shown closed and assembled except for one of the side panel covers;

FIG. 10 is a top view of the personnel parachute pack shown almost completely closed and assembled;

FIG. 11 is a section of the personnel parachute pack shown almost completely closed and assembled, and is taken on lines 11—11 of FIG. 10 but on a larger scale;

FIG. 12 is a top view of the personnel parachute pack but shown after the locking device for releasably holding the closure flaps and the side flaps in closed position has been pinned into locking position;

FIG. 13 is a front view of a stiffener adapted to be inserted into the front panel of the personnel parachute pack;

FIG. 14 is a top view of the stiffener but shown on a larger scale;

FIG. 15 is a section of the stiffener taken on lines 15—15 of FIG. 13 but shown on a larger scale;

FIG. 16 is a section of the stiffener taken on lines 16—16 of FIG. 13 but shown on a larger scale;

FIG. 17 is an inside view of the rear panel of the pack to illustrate generally the manner in which the main parachute is stowed in the pack;

FIG. 18 is a front view of the riser-shoulder harness assembly in connection with the rip cord assembly;

FIG. 21 is a section of the pilot chute taken on lines 21—21 of FIG. 20;

FIG. 22 is a section of the pilot chute taken on lines 22—22 of FIG. 20; and

Figure 5:
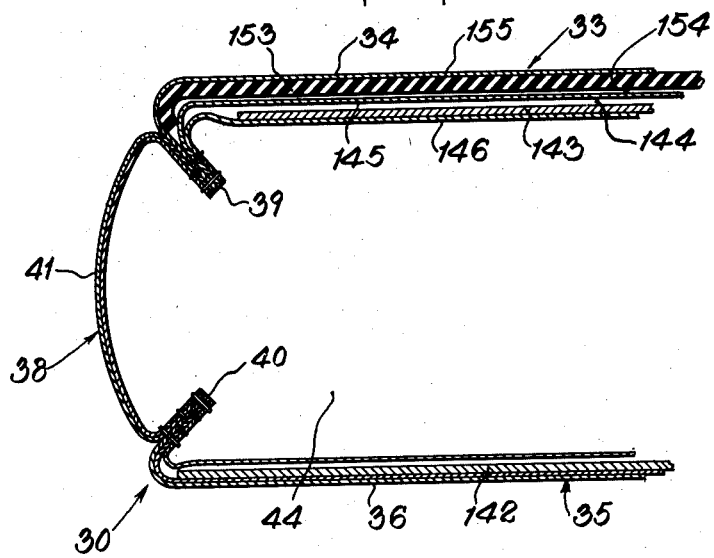
FIG. 5 is a detail section of the personnel parachute pack taken on lines 5—5 of FIG. 3 but shown on a larger scale.
Figure 6:
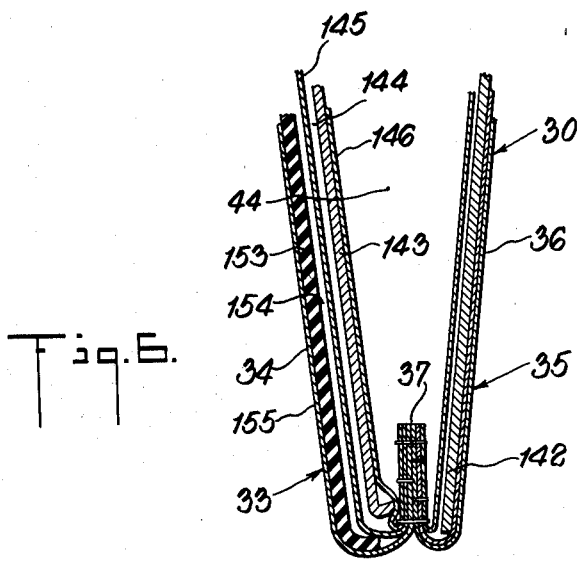
FIG. 6 is a detail section of the personnel parachute pack taken on lines 6—6 of FIG. 3 but shown on a larger scale.
Figure 19:
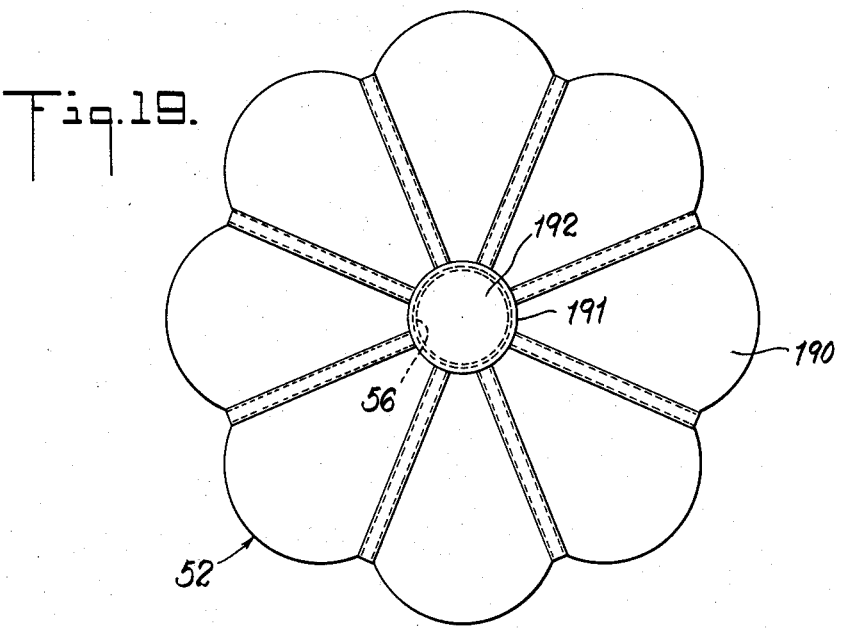
FIG. 19 is a top view of the pilot chute employed in connection with the personnel parachute pack of the present invention.
Figure 20:
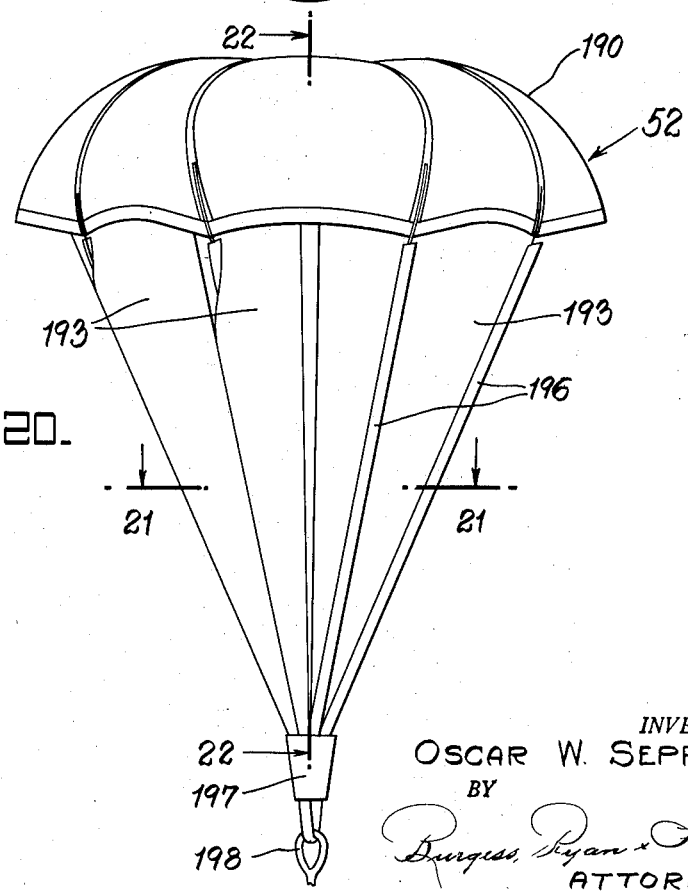
FIG. 20 is a side view of the pilot chute.

The personnel parachute pack assembly 10 of the present invention was designed for use in connection with an aircraft seat ejection system, but as will be made apparent hereinafter, the pack assembly has features adaptable for use aside from any such system.

The seat ejection system illustrated in FIG. 1 is shown, as an example, of the Martin-Baker type, and since this type of system is well known in the art, it is illustrated diagrammatically. This system comprises a seat 11 in the cockpit of the aircraft, and a face blind handle 12 located so that it extends directly over the head of the airman and connected to a face screen (not shown). This face screen has two functions, namely (a) to protect the airman's face against damage by the force of the slipstream and to avoid the risk of his lungs being inflated by the air pressure as the seat is ejected from the aircraft, (b) and to actuate or release the firing mechanism of the main ejector gun to launch the seat 11 automatically as the screen is drawn over the airman's face.

The seat 11 is ejected from the aircraft by an ejection gun (not shown) operating between the seat frame and a fixed part of the aircraft. When the seat is ejected from the aircraft, a drogue parachute (not shown) in a drogue parachute container 13 is deployed automatically by a drogue gun (not shown). This drogue gun may be fired by a static line or cable connected to a suitable fixed part of the aircraft, so that when the seat is safely launched, the pull on the cable will cause the drogue gun to be fired and the drogue parachute to be drawn out thereby, or may be fired by a time delay mechanism which is set in motion as the seat leaves the cockpit of the aircraft. The open drogue parachute steadies and retards the seat 11.

The main personnel parachute is stowed in the pack 10, which is different from the drogue parachute pack 13 and which is secured to the seat back 15.

After the sequence of events described, the ejected seat 11 is partially released from the airman, and the main pack 10 is separated from the seat back 15, leaving the airman under the control of the open drogue parachute and with the main pack on his back. Under the influence of the open drogue parachute, pack release pins 89 and 90 (FIGS. 12 and 18) are pulled out from the pack 10, causing the pack to be opened and the main parachute to be extracted from the pack by the drogue parachute. The seat 11 at this time is still partly attached to the airman by means of straps (not shown) connected to the airman's parachute harness. As the main parachute canopy develops, the inertia of the seat disengages spring clips (not shown) attaching these straps to the seat and permits thereby the seat to fall away from the airman. The airman then makes a normal descent under the retarding influence of the open main parachute.

The functions described are those of a well known type of seat ejection system. The present invention is concerned with the construction of the personnel pack assembly 10, per se, and to its component parts, and as far as certain features of the invention are concerned, with its relation to a seat ejection system broadly, by which the personnel pack assembly may be operated selectively, either in conjunction with the seat ejection system, in which case this pack assembly comes into play only after the seat is ejected from the cockpit or independently thereof. For the latter operation, the airman can sever the connection between the pack release pins 89 and 90 and the drogue gun in the aircraft and can leave the seat and the aircraft, taking the pack with him. The pack 10 so separated from the seat ejection system, can be controlled by the airman independently of this seat ejection system to deploy the main parachute for normal descent.

Referring to FIGS. 1 and 2 of the drawings, the pack 10 is of inverted U-shape and is positioned against the seat back 15. The two dependent limbs 16 of the pack provide a space 17 therebetween through which the lower ends of pack restraint straps 18 and a lug (not shown) of shoulder straps 20 may be attached to the seat back, the point of attachment being at the upper end of the inverted U-shaped space 17, so that the pack is securely held in position. The upper extremity of each pack restraint strap 18 is releasably attached to the seat structure 15 and the lower ends of these straps are releasably attached to the seat structure in the manner well known in the art. The pack 10 can be separated from the seat 11 under the control of the airman by releasing the shoulder straps 20 and the lower extremities of the pack restraint straps 18, in the manner well-known in the art.

The manner in which the main pack 10 of the present invention is attached to the seat 11 and the manner in which it can be separated from the seat under the control of the airman, forms no part of the present invention. Also, the manner in which the drogue line connected to the pack release pins 89 and 90 to be described is severed to permit the airman to leave the aircraft and the seat, while carrying the personnel parachute pack, forms no part of the present invention, and may be in the form of a knife (not shown) operated under the control of the airman while in the aircraft.

The personnel parachute pack 10 comprises a U-shaped case 30 (FIGS. 3–6), which when packed and operative on the aircraft ejection seat 11 is in inverted position with limbs 16 depending, as described. The case 30 comprises in general, a front panel 33 with depending limbs 34, a rear panel 35 with depending limbs 36, these front and rear panel limbs being directly connected together along the bottom by stitched seams 37, an inverted U-shape crotch panel 38, secured to the inner sides of said limbs 34 and 36 by stitched seams 39 and 40 and having depending limbs 41 of substantially triangular shape tapering toward the lower ends, and outer adjustable multi-piece side panels 42 (FIGS. 4 and 9) of substantially triangular shape similar to that of the crotch limbs 41 (FIGS. 3–5) and similarly tapering towards their lower ends. The case panels 33, 35, 38 and 42 are made of flexible duck or other strong fabric and some of these are stiffened and reinforced in a manner to be described.

Figure 23:
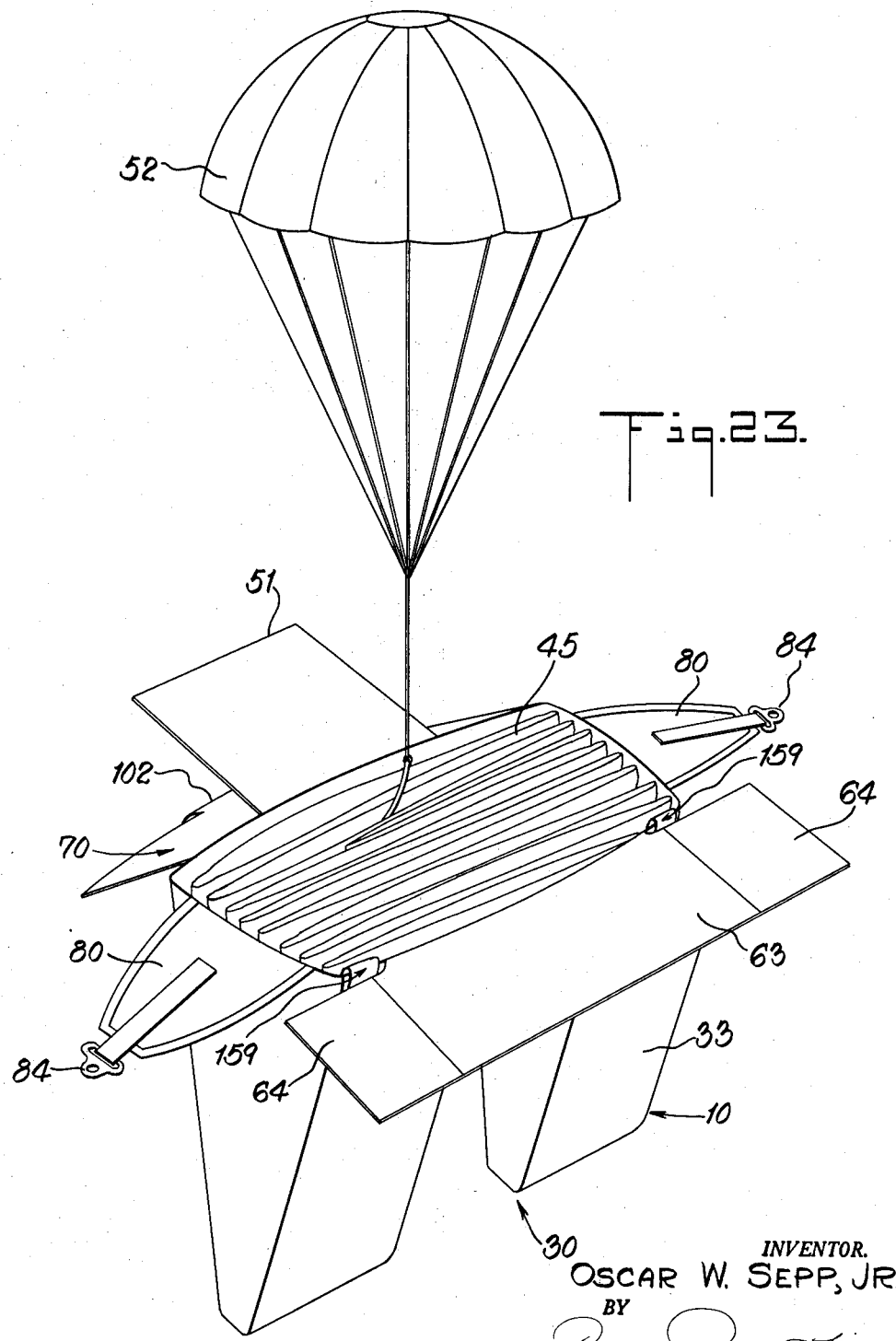
FIG. 23 is a perspective of the personnel parachute pack after the pilot chute has been deployed therefrom and just as the main parachute is being drawn by said pilot chute from the pack.

The case 30 constructed as described defines compartment 44 (FIGS. 5, 6, 7, 7a and 11) for the stowage of a main parachute 45 (FIG. 23).

Connected to the opposite sides of the upper end of the rear panel 35 (FIGS. 4, 7, 7a, 8 and 17) are two narrow flaps 50 of flexible material such as duck adapted to be folded across the top of the side sections of the main parachute stowage compartment 44. Also connected to the upper end of the rear panel 35 between the flaps 50 is a container 51 (FIGS. 7, 7a, 11, 17 and 23) for a pilot chute 52 (FIGS. 11 and 23) of the spring-impelled type to be more fully described hereinafter. This container 51, defining a pocket or compartment for the pilot chute 52, is adapted to be folded approximately along a fold line 53 (FIGS. 4, 7, 7a, 8, 11 and 17) and across the top of the main parachute stowage compartment 44 and comprises a flat fabric base 54 partially stiffened by an insert or reinforced by any other means and a conical seat 55 (FIGS. 7 and 11) of substantially rigid material secured to said base, as for example, by stitching to center and hold the spring 56 of the pilot chute 52. Four quadilateral flaps 57 of flexible fabric material, secured to the base 54, as for example, by stitchings 58 are quadrantly arranged over the base 54 and come together in cruciform edge to edge relationship to cover jointly the collapsed pilot chute 52. The stitchings 58 extend only along an outside corner of each flap 57 to permit these flaps to be folded back for assembly or for deployment of the pilot chute 52. A pair of tabs 60 (FIG. 7) secured at their inner ends to the base 54 of the pilot chute container 51 have respective grommets 61 at their outer ends to receive a retainer rod or wire (not shown) for temporarily holding the spring-pressed pilot chute 52 under compression, while the pack is being assembled. After some of the closures of the case 30 have been locked in closed position in the manner to be described, the retainer rod can be pulled out from tabs 60.

The pilot chute container 51 with the pilot chute 52 stowed therein is folded along the fold line 53 and across the top of the main parachute stowage compartment 44 in the assembled pack.

The pilot chute container 51 is protectively covered by a plurality of overlapping flaps across the top of case 30, and these flaps are releasably retained in closed position by a locking device including the pack release pins 89 and 90, and released by manual operation of a rip cord unit, to permit these flaps to flip into open position under the expanding action of the spring 56 of the pilot chute 52, as will be described. To assure quick opening of some of these flaps, elastic strap means are secured to these flaps. These elastic strap means are held under tension by the locking device and are released when the locking device is released by manual control to cause these flaps to flip into open position under the influence of said straps assisted by the expanding action of the released pilot chute spring 56, in a manner to be described.

To protectively cover the pilot chute container 51 in closed position across top of the case 30, there is secured to upper end of the front case panel 33 a top inner closure flap 63 (FIGS. 3, 4, 7, 7a, 8, 11 and 12) with two side extensions 64. The flap 63 is adapted to be folded approximately along the fold line 65 over the pilot chute container 51 and over the flaps 50 flanking said container during the assembling of the pack, and the side extensions 64 are adapted to be folded downwardly approximately along the reinforced lines 66 into the sides of the main parachute compartment 44 to hold the closure flap 63 down neatly over the pilot chute container 51. The base of the closure flap 63 forms with the upper end of the front panel 33, side slits 67, taped along their edges for reinforcement and defining narrow openings at the upper end of the front panel 33 of the case for the passage of risers into the interior of the main parachute compartment 44.

The inner closure flap 63 is partially stiffened between its side extensions 64 by an insert or in any other way and has a pair of conical locking posts or lugs 68 in its stiffened section secured thereto, as for example, by stitching and having respective locking pin retaining apertures 69 near their outer tips.

During assembly, the inner closure flap 63 is folded from the front side of the case 30 over part of the pilot chute container 51 and over parts of the flaps 50. An outer closure flap 70 (FIGS. 4, 7, 7a, 8, 10, 11 and 12) is folded from the rear side of the case 30 over the inner closure flap 63 and over the other part of the pilot chute container 51 and the other parts of the flaps 50. The outer closure flap 70 is secured to the upper end of the rear case panel 35 and is adapted to be folded approximately along the fold line 53, and over the inner closure flap 63.

The outer closure flap 70 basically of flexible fabric, such as duck, is of substantially rectangular shape and is large enough to extend substantially along the full top of the case 30, when said flap is in closed position folded down along the fold line 53. An intermediate reinforced section 71 of the outer closure flap 70 is substantially as long as the closure flap 63 which it is adapted to overlap in assembled condition of the pack, and contains two grommets 72 spaced to receive the locking posts 68 therethrough when the pack is so assembled. This intermediate flap section 71 has a rectangular oblong portion 73 near its base reinforced with a rigid stiffener 74 in the form of a flat rectangular bar. Secured to this portion 74, as for example, by stitching, are two eyelets 75, to which may be attached hooks 76 on one end of elastic straps 77, the other ends being hooked to eyelets 78, secured as, for example, by stitching to the rear case panel 35. These elastic straps 77 function to pull back the outer closure flap 70 quickly into open position when said closure flap is released in a manner to be described.

The locking posts 68 are adapted to releasably retain across the top of the case 30, not only the outer closure flap 70 but also side flaps 80 (FIGS. 3, 4, 7, 7a, 8, 10 and 12), constituting upper extensions of covers 81 respectively, which are hinged on one side to the sides respectively of the case 30 and which serve to protectively screen the adjustable side panels 42 of the case 30 in assembled condition of the pack, as will be described more fully. The locking posts 68 also serve to retain a rigid lock plate 82 (FIGS. 11, 12 and 18) of strong material, such as metal, forming part of the releasable closure locking means to be described. The lock plate 82 has a pair of holes 83, spaced and dimensioned to permit the locking posts 68 to pass freely therethrough in assembled condition of the pack.

Clip rings 84 (FIGS. 3, 4, 7, 7a, 8 and 11) secured to the side flaps 80, as for example, through tapes 85 stitched to said side flaps, are adapted to be slipped over the locking posts 68 and over the outer closure flap 70 in assembled condition of the pack to hold said side flaps down in case closing position. The locking posts 68 are of highly polished metal, and their conical configuration permits the clip rings 84, the lock plate 82 and the outer closure flap 70 impaled thereon, to slide off said posts quickly when released through the release of the lock plate 82. The lock plate 82 is retained on the locking posts 68 through the pack release locking pins 89 and 90 passing through the apertures 69 in said posts and releasable through the rip cord unit, as will be described.

During assembly, after the outer closure flap 70 has been folded over the inner closure flap 63 with the grommets 72 on said outer closure flap 70 slipped over the locking posts 68, and after the elastic straps 77 have been hooked to the eyelets 75 on said closure flap 70, the clip rings 84 of the side flaps 80 are impaled on the locking posts and over the outer closure flaps, as shown in FIG. 8. The lock plate 82 is then impaled on the locking posts 68 directly over the impaled clip rings 84 with these posts extending through and above said plate and the apertures 69 on said posts projecting above said lock plate 82. The pack release pins 89 and 90 are then slipped through the apertures 69 respectively in the locking posts 68 to releasably retain the lock plate 82 in locking position and to hold thereby the overlapping closure flaps 63 and 70 down over the pilot chute container 51, and the side flaps 80 down over said closure flaps, as shown in FIG. 12. This lock plate 82 is connected to the rip cord unit in a manner to be described.

The rip cord unit comprises a flexible conduit 91 (FIG. 18) attached to the riser-shoulder harness assembly 159, in the manner to be described, and rigidly secured at one end to one end of the lock plate 82. A flexible cable 92 slidably extending through the conduit 91 is secured at one end to a handle 93 supported on one of the risers 167 through the conduit 91 and has a loop 94 at the other end slipped over the pin 89 to secure said other end to a bridle 95 carrying the two pack release pins 89 and 90. These pack release pins 89 and 90 are adapted to be passed through the apertures 69 respectively in the locking posts 68, while the lock plate 82 is in assembled position impaled on said locking posts and lying over the impaled clip rings 84, as shown in FIGS. 11 and 12. In this assembled position of the pack, the two overlapping closure flaps 63 and 70 and the side flaps 80 are held down in closed position by the lock plate 82. When the cable 92 is pulled through manipulation of the handle 93, the pins 89 and 90 are pulled out of the locking posts 68, thereby releasing the lock plate 82, so that the clip rings 84 will be free to slip off the locking posts 68, thereby causing the side flaps 80 connected to the side panel covers 81 to be snapped back sideways on the case 30 by elastic straps to be described, and causing the outer closure flap 70 to be snapped back into open position by the elastic straps 77 hooked thereon. With all these protective flaps and locks released, the pilot chute 52 will be impelled forcibly from its container 51 through the expansive action of its built-in spring 56.

To protect the lock plate 82 and the bridle 95 with its pack release pins 89 and 90 against accidental release, there is provided a pair of substantially rectangular protective flaps 100 and 101 (FIGS. 3, 4, 7, 7a, 8, 10, 11 and 12) substantially coextensive in size and shape and arranged face to face. These flaps 100 and 101, which are of fabric material such as duck, and which are flexible except for a specific section of the flap 100 where it is stiffened, as will be described, are secured together and to the outer edge of the intermediate section 71 of the outer closure flap 70 approximately along the line 102 and are adapted to be folded along said line and over the pinned lock plate 82 and the closure flap 70 in the process of assembling the pack. This intermediate flap section 71 has secured to its stiffened portion 73, as for example, by sewing, a pair of snap fastener buttons 104, and the flap 100 has an intermediate section 105, which is reinforced with a rigid stiffener 106 in the form of a flat rectangular bar, and which is adapted to protectively overlie the lock plate 82 in assembled condition of the pack, as shown in FIG. 11. The flap 100 has a pair of grommets 107 near its free end adapted to be slipped over the snap fastener buttons 104 respectively on the outer closure flap 70 when said flap 100 is folded down along the line 102 and over the pinned lock plate 82.

The second flap 101, also foldable along the fold line 102 with the flap 100, has a pair of snap fastener sockets 110 secured thereto, as for example, by sewing and located in registry with the grommets 107 respectively. These snap fastener sockets 110 passing through the grommets 107 are adapted to be snapped into engagement with the snap fastener buttons 104 on the outer closure flap 70. The flap 101 thereby covers the stiffened section 105 of the flap 100 and through its snap attachment to the outer closure flap 70 holds the flap 100 in closure protective position in relation to the pinned lock plate 82.

Summarizing the sequence of assembling steps, the case 30 from the fully open position shown in FIG. 7, has its flaps 50 folded down over the side sections of the main parachute compartment 44 and its inner closure flap 63 folded along the fold line 65 over the pilot chute container 51 and over the flaps 50, as shown in FIG. 7A. The outer closure flap 70 is then folded along the fold line 53 over the inner closure flap 63 with the grommets 72 on said outer flap impaled on the locking posts 68. The side flaps 80 are then folded over the outer closure flap 70 and clip rings 84 are slipped over the locking posts 68. The lock plate 82 is then impaled on the locking posts 68 directly over the impaled clip rings 84 and the pack release pins 89 and 90 are slipped through the apertures 69 respectively in the locking posts 68 projecting above the lock plate, as shown in FIG. 12. The protective flaps 100 and 101 are then folded along the fold line 102 over the pinned lock plate 82 and the outer or second protective flap 101 snapped into engagement with snap fastener buttons 104 on the outer closure flap 70, exposed through the grommets 107 on the inner protective flap 100, as shown in FIGS. 10 and 11.

The case 30 is constructed in such a way as to permit the main parachute 45 to be folded, arranged and stowed in the compartment 44 of said case orderly and conveniently. For that purpose, the case 30 is substantially of flexible fabric construction with parts thereof adjustable to permit expansion of the case during the process of arranging and stowing the main parachute 45 in the case and to permit contraction of the case after the parachute has been properly arranged and stowed in the case, so that the bulk of the pack can be reduced to a minimum and the orderly arrangement of the stowed parachute in its compartment 44 will be maintained. At the same time, the case 30 is constructed with stiffening means insertable therein after the main parachute 45 has been stowed, to afford the convenience of flexibility during the process of stowing the main parachute 45 in the case and to attain the advantage of form-sustaining rigidity after the parachute has been so stowed. With the case 30 compacted and stiffened, the orderly arrangement of the stowed parachute 45 in its compartment 44 cannot be disturbed.

For the purpose of imparting adjustability to the case 30, each of the side panels 42 of the case comprises two fabric pieces 120 and 121 (FIGS. 4 and 9), the piece 120 being in the form of an elongated rectangle and being secured to the corresponding side of the rear case panel 35, as for example, by stitching, and having a row of grommets 122 for a lacing 123 therealong. The other side panel piece 121 tapers downwardly and is secured at its inner edge to the corresponding side of the front case panel 33, as for example, by stitching. This panel piece 121 has a row of grommets 124 along its outer free edge corresponding in number and spacing to the grommets 122 on panel piece 120. The lacing 123 passing through the grommets 122 and 124 serves to adjustably unite the side panel pieces 120 and 121, so that the sides of the case can be expanded or contracted to suit the convenience of assembling and to attain the benefits of compactness during storage and installation.

A reinforced sheet 126 of substantially triangular form hinged to the side of each side of the rear panel 35 extends in the inner side of the corresponding side panel 42 in assembled condition of the pack and serves as the inner side wall of the parachute stowage compartment 44 and as an inner backing for the corresponding side panel 42.

To protect the lacings 123 on the side panels 42 after the main parachute 45 has been stowed in the case compartment 44 and after the lacings 123 have been tightened and tied fast, there is provided the cover 81 (FIGS. 3, 4 and 9) on each side of the case 30, hinged on one side to the corresponding side of the front panel 33, as for example, by stitching and having a reinforcement layer. Each of these covers 81 is substantially triangular in shape corresponding to the shape of the side panels 42 when fully laced and contracted, to overlap the corresponding side panel 42 coextensively. A plurality of tabs 127 secured to each side of the rear panel 35, as for example, by stitching, and carrying respective snap fastener sockets 128, are adapted to overlie the free edge of the corresponding closed cover 81 and to be snapped onto snap fastener buttons 130 respectively near said edge of said cover to maintain releasably said cover in closed screening position against the corresponding laced side panel 42.

The side flaps 80 (FIGS. 3, 4, 7, 7a, 8, 9, 10 and 12)

form upper extensions of the side covers 81 respectively and are substantially triangular in shape. In assembled condition of the pack with the covers 81 in closed protective position against the tightly laced side panels 42, the side flaps 80 will be folded approximately along fold lines 135 across the top of the case 30. In this folded position of the side flaps 80, these flaps will extend over the side extensions 64 of the closure flap 63 tucked downwardly into the sides of the main parachute compartment 44 and will overlie the side sections of the outer closure flap 70 lying across the top of the compartment. The clip rings 84 secured to the side flaps 80 and impaled on the locking posts 68, hold these side flaps down, when the lock plate 72 is locked by the pack release pins 89 and 90 passing through the apertures 69 in said locking posts.

To assure quick pull-back of the side flaps 80 immediately upon release of the lock plate 82 without waiting for the expansive action of the pilot chute spring 56, there is provided for each side flap 80 an elastic strap 136, slidably passing through a guide formed by stitching the sides of a tape 137 to the outside of the corresponding cover 81 and having its lower end releasably hooked to an eyelet 138 stitched to the cover and having its upper end provided with a hook 140 for engagement with an eyelet 141 stitched to the corresponding tape 85 carrying the corresponding clip ring 84. After the side flaps 80 with the elastic straps 136 tensionally released have been laid down over the top of the case 30 during assembly, the straps are pulled to hook them to the eyelets 141, so that the straps are tensioned in assembled condition of the pack. Immediately upon depinning of the lock plate 82, the tensioned elastic straps 136 will pull back the side flaps 80 into open position.

FIG. 8 shows the straps 136 tensioned directly after the clips 84 have been impaled on the locking posts 68, but it may be difficult to hold these clips down on these posts against the pulling action of the elastic straps 136 during assembly. For that reason, the straps 136 may be hooked onto the eyelets 141 after the lock plate 82 has been impaled on the locking posts 68 projecting through the ring clips 84 of the side flaps 80 and after the lock plate has been fastened with the pins 89 and 90, as shown in FIG. 12.

As already described, the main parachute 45 is arranged and stowed in the case compartment 44, while the lacings 123 in the adjustable side panels 42 are loose. The side panels 42 with the lacings 123 loose are flexible, so that the parachute 45 can be easily and conveniently arranged and stowed in the case compartment 44. The rear panel 35 has permanently attached thereto a stiffener 142 (FIGS. 4, 5, 6 and 11) of plastic material in the form of a rigid flat U-shaped plate conforming therewith in size and shape, but since the front panel 33 is flexible during pack assembly, the flexibility of this front panel plus the flexibility and expansiveness of the side panels 42 afford ease in arranging and stowing the main parachute 45 in its compartment 44. After the main parachute 45 has been stowed in the compartment 44, a stiffener 143 (FIGS. 3, 5, 6, 11 and 13-16) is inserted in a pocket 144 formed in the front panel 33 between two flexible fabric sheets 145 and 146, which are sewed together on all sides except at the top where an opening is provided to permit the stiffener 143 to be inserted therethrough. The outer sheet 145 has connected thereto at the top a marginal flap 147 adapted to be folded over the stiffener 143 and having a series of snap fastener buttons 148 adapted to be snapped into engagement with snap fastener sockets 150 along the upper edge of the inner sheet 146 to retain the stiffener in position in the pocket 144 and to releasably close the upper end of said pocket.

The stiffener 143 is of rigid light construction such as plastic material, and more specifically may be made of a polyester resin with a glass-fiber base, and may be of laminated construction if desired. The stiffener 143 is U-shaped and slightly dished at the side sections 151 (FIGS. 13-16) so that the edges thereof turn inwardly and do not protrude against the front panel 33 of the case 30. Since the pack 10 serves as a back and head rest for the airman when the pack is connected to the seat 11, the stiffener 143 has a concavity in its bridge section 152 between its side sections 151 against which the head of the airman can rest with comfort.

A thin U-shaped cushion pad 153 (FIGS. 5, 6 and 11), as for example, of foam rubber or polyurethane, permanently forms a part of the front panel 33 to serve as a back and head rest for the airman and is retained in a pocket 154 formed in said panel between the sheet 145 and an outside sheet 155, the two sheets being secured together on all sides by stitching. The cushion pad 153 although imparting a certain amount of rigidity to the front panel 33 even in the absence of the stiffener 143, still has enough flexibility to permit convenient packing of the case in the manner described.

The main parachute 45 is stowed in the compartment 44 while the lacings 123 on the side panels 42 are loose or removed and while the stiffener 143 is removed. After the main parachute 45 has been stowed in the compartment 44, the stiffener 143 may be inserted into the case 30 in the manner previously described, and the lacings 123 then tightened to compress the pack into a compact unit, in which the neat and proper arrangement of the parachute cannot be disturbed.

The manner in which the main parachute 45 is folded and arranged in the compartment 44 of the case 30 and some of the means by which the different parts of the parachute are held in proper relationship for deployment therefrom may be similar to those well known in the art. In the specific form shown, there is provided for stowing the shroud lines 156 (FIGS. 17 and 18) of the main parachute, rows of fabric loops 157 and 158 stitched to the rear panel 35 of the case 30 and serving to retain the bundle of shroud lines in serpentined order for successive release as the parachute 45 is pulled out of the compartment 44 by the pilot chute 52.

The connector ends of the riser-shoulder harness assembly 159 (FIG. 18) are releasably attached to the inside of the stowage compartment 44 of the main parachute 45. For such attachment, the front panel 33 of the case 30 and specifically the inside fabric sheet 146 of said panel has secured to the inside thereof two webbings 160 (FIGS. 3 and 11) stitched to the upper sides thereof and carrying a plurality of snap fastener buttons 161. The inside risers 162 and 163 (FIG. 18) of the riser-harness assembly 159 have connected thereto webbings 164 with snap fastener sockets 165 for releasable snap attachment to the snap fastener buttons 161 inside the case compartment 44. The side slits 67 (FIGS. 2, 3 and 9) formed in the base of the closure flap 63 permits the inner risers 162, 163 and the outer risers 166 and 167 to pass through said slits into the interior of the compartment 44 for engagement with the fastener webbings 160 and upon release and deployment of the shroud lines 156 from the compartment 44 in the manner described, the webbings 164 snap off the webbings 160 on the inside of the rear panel 35, thereby connecting the main parachute 45 to the airman directly through the riser-harness assembly 159.

The riser-shoulder harness assembly 159 (FIG. 18) comprises the superposed risers 162 and 166 for the right side of the assembly and the superposed risers 163 and 167 for the left side of the assembly. At one end, each of the pair of superposed risers 162, 166 and the pair of superposed risers 163, 167 carries a release 170 of any well known type, for example that known as Rocket Jet Release, for quickly connecting the risers to shoulder straps on the airman or for quickly disconnecting the risers from said straps. At the other end, each of the risers 162, 163, 166 and 167 carries a respective connector link 171 for a set of shroud lines 156 connected to the canopy of the main parachute 44, in the well known manner.

The rip cord assembly is partially connected to the riser-shoulder harness assembly 159. For that purpose, one of the leg sections of the riser-shoulder harness assembly, desirably the one which would extend over the airman's left shoulder, and specifically the riser 167, has secured thereto a pair of straps 175 (FIG. 18) secured to the riser 167, as for example, by stitching and carrying snap fastener sockets 176 for releasable connection to fastener buttons 177 on said riser. These straps 175 serve to hold the flexible conduit 91 of the rip cord assembly along the riser 167. The cable 92 in the conduit 91 for pulling the pins 89 and 90 for pack release, passes at one end through a fabric loop 178 secured to the riser 167, and through a hole 179 in a webbing 180 secured to said riser and to said loop and is connected to the handle 93 at this end. A friction clamp (not shown) in the loop 178 releasably holds the handle 93 against accidental displacement.

In assembled condition of the pack 10, the pair of superposed risers 162 and 166 and the pair of superposed risers 163 and 167 pass through respective slits 67 in the top sides of the case 30 and are snapped onto the webbings 160 inside said case, as already described, while the flexible conduit 92 of the rip cord assembly is diverted to one side of the case 30 for extension over the closure flap 80, as shown in FIGS. 2 and 12. The other part of the riser-shoulder harness assembly 159 outside of the case 30 is folded back and releasably held against the front panel 33 of the case 30 by a pair of straps 185 (FIGS. 2 and 3) on the upper sides of said panel stitched at one end to the panel and carrying respective fastener snap sockets 186 at the other end. Tapes 187 secured to the front panel 33, as for example, by stitching, carry respective fastener snap buttons 188. With the riser-shoulder harness assembly 159 doubly folded against the front panel 33, the straps 185 can be looped over the two leg sections of this assembly respectively and snapped onto the fastener buttons 188 to hold these two leg sections releasably in inoperative position, as shown in FIG. 2. The riser-shoulder harness assembly 159 will remain in this inoperative position while on the ejection seat 11 and while the aircraft is under normal flight. In the case of emergency, whether escape through the seat ejection system or independently thereof as indicated, the two leg sections of the riser-shoulder harness assembly 159 are pulled down, thereby releasing the straps 185, and the releases 170 are buckled onto the shoulder straps on the airman. After the shroud lines 156 of the main parachute 45 have been extracted from the case 30 by the developing or developed canopy of said parachute, the pull on the risers 162, 163, 166 and 167 frees the risers from the snap connection with the webbings 160 on the inside of the case 30, so that the airman is directly connected to the parachute through the riser-shoulder harness assembly 159.

The pilot chute 52 is of the spring-ejectable type to adapt it for use with the specially constructed pack 10 described, and is constructed to permit its canopy to develop quickly once it is ejected from the container 51 of said pack. For that purpose, the pilot chute 52 has a canopy 190 and a central fabric cone 191 tapering downwardly and housing in its upper canopy region the ejection coil spring 56 of similar tapering contour. The ends of this spring 56 are secured to the walls of the cone 191, as for example, by tying said spring ends to said walls, and the lower smaller end of the spring is dimensioned to fit snugly over the base of the conical seat 55 in the pilot chute container 51, as shown in FIG. 11. A hood 192 of strong fabric material, such as duck, is stitched to the upper end of the cone 191 and to the canopy 190 over the spring 56, and serves as a bearing for the upper end of the spring and as a means by which the pilot chute 51 can be handled during the process of assembling the pack 10.

A plurality of radially disposed generally triangular stabilizing vanes 193 of fabric are secured along their inner edges 194 to the fabric cone 191 and along their outer edges 195 to shroud lines 196. At the lower end, the stabilizing vanes 193 and the shroud lines 196 connect into a shackle 197, which in turn connects into a line 198 (FIG. 23) joined to the top of the canopy of the main parachute 45 through a plurality of lines (not shown) in the manner well known in the art, so that this main parachute will be withdrawn from the compartment 44 of the case 30 by the pull of the pilot chute 52.

As was previously indicated in connection with the operation of the seat ejection system, after seat ejection and the opening of the drogue parachute, the pack release pins 89 and 90 are pulled out to release the pack 10 for the release of the pilot chute 52 and the main parachute 45. For that purpose, a line 200 (FIGS. 12 and 18) in the release mechanism of the seat ejection system, tensioned by the full development of the drogue parachute and connected to the bridle 95, pulls this bridle and thereby pulls the release pins 89 and 90 from the locking posts 68. This operation releases the pack 10 in the manner described, causing ejection of the pilot chute 52 and then of the main parachute 45, as described. When the airman desires to leave the aircraft with the pack 10 without going out through the seat ejection system, he severs the line 200 by a suitable cutting device, permitting him to control the release pins 89 and 90 through the rip cord device, as described.

In the operation of opening the pack 10, the pull on the pins 89 and 90, either through the operation of the rip cord unit or through the operation of the drogue parachute, releases the lock plate 82. The elastic straps 136 will pull back the side flaps 80 and the elastic straps 77 will pull back the outer closure flap 70, taking with it the released lock plate 82 between the protective flaps 100 and 101 attached to the flexible conduit 92 of the rip cord unit. With the released lock plate 82 out of the way, the expansive action of the spring 56 in the pilot chute 52 will flip back the inner closure flap 63 and will eject the pilot chute out of its container 51. The development of the pilot chute 52 will extract the main parachute 45 in the manner made apparent.

While the invention has been described with particular reference to an embodiment thereof, it is to be understood that it is not to be limited thereto but is to be construed broadly and restricted by the scope of the appended claims.

What is claimed is:

1. In a personnel parachute pack, the combination comprising a case of substantially preformed shape independently of any parachute therein open at one end and defining a compartment for stowing a main parachute, a self-contained container at the open end of said case formed independently of any part of said case but foldably attached to a wall of said case at its open end for stowing a pilot chute for said parachute, flap means independently of said container foldable in closed position over said container, elastic strap means urging said flap means into open position independently of the pilot chute, and releasable locking means for holding the pilot chute in its container and for holding said flap means in closed position against the action of said elastic means.

2. In a personnel parachute pack, the combination as described in claim 1, wherein said elastic strap means are in the form of elastic straps extending between the flap means and the case walls and each having end connections to said flap means and to the case walls respectively.

3. In a personnel parachute pack, the combination as described in claim 2, wherein at least one of the end connections of each of said straps is releasable to facilitate assembly of the pack.

4. In a personnel parachute pack, the combination comprising a case of substantially preformed shape independently of any parachute therein open at one end and defining a compartment for stowing a main parachute, a self-contained container at the open end of said case formed independently of any part of said case but foldably attached to a wall of said case at its open end for stowing a spring-ejectable pilot chute for said parachute, a plurality of flaps at the open end of said case independently of said container adapted to be folded over said container, releasable locking means protectively covered by at least one of said flaps for holding the pilot chute in said container against the action of the spring and for holding said flaps in closed position against the action of said spring, and elastic straps extending between and connected to said flaps and to the case walls, whereby upon release of said locking means said flaps are pulled back by the elastic action of said straps.

5. In a personnel parachute pack, the combination comprising a case open at one end and defining a compartment for stowing a parachute, a closure flap hinged to a wall of said case at its open end and foldable across the top of the compartment, means for releasably locking said closure flap in folded position over the compartment, a releasable part of said locking means being on the outside of said closure flap and attached thereto in assembled position of said locking means, a pair of inner and outer protective flaps of flexible material in face to face relationship secured to said closure flap along its outer edge and foldable over said releasable part of said locking means and against said closure flap, and snap fastener means for releasably fastening the outer protective flap to said closure flap in folded position of said outer protective flap, and including snap fastener elements on said outer protective flap, and mating fastener elements on said closure flap, said inner protective flap having grommets through which the fastener elements on said outer protective flap pass for fastening engagement with the fastener elements on said closure flap in folded positions of said flaps, said inner protective flap carrying a rigid stiffener in position to overlie the releasable part of said locking means in folded position of said inner protective flap.

6. In a personnel parachute pack, the combination comprising a case open at one end and defining a compartment for stowing a parachute, said case having laced side panels adjustable to permit expansion and contraction of said case to facilitate stowing of the parachute therein, a side cover hinged to each side of the case and adapted to be folded over the outside of the corresponding side panel in protective position to screen the lacing of the latter panel when said pack is in assembled condition, said side covers having respective end extensions forming side flaps adapted to be folded across the open end of said case from the sides thereof in assembled condition of said pack, inner and outer closure flaps hinged to opposite walls respectively of said case between said sides at its open end and foldable in overlapping relationship across the top of the container in folded position of said container, and means for releasably locking said flaps in folded positions across the open end of said case and comprising a pair of locking posts secured to the outer face of the inner closure flap and having respective apertures near their outer ends, said outer closure flap having two holes through which said posts pass respectively and from which they project in overlapping positions of said closure flaps, a lock plate having a pair of holes by which said lock plate may be impaled on the projecting ends of said locking posts with the apertured end sections of said locking posts projecting beyond said lock plate, pack release pins adapted to pass through the apertures of said locking posts to releasably hold the locking plate in impaled position and thereby to hold the closure flaps in folded overlapping position over the folded container, and a cable for pulling said pins from said apertures, said side flaps having respective ring clips at their outer ends adapted to be impaled on said posts respectively between said lock plate and the bases of said locking posts in locked condition of said means, and an elastic strap on each of said side flaps to draw back said side flaps when said lock plate is released by the withdrawal of said pins from said locking posts.

7. In a personnel parachute pack, the combination comprising a case of substantially preformed shape independently of any parachute therein open at one end and having front and rear wall panels of flexible material conjointly defining a compartment for stowing a parachute, one of said walls having a pocket extending substantially across the full area of said wall panel and having an opening at the open end of the case, and a stiffener adapted to be inserted in said pocket through said opening after the parachute has been stowed in said compartment to stiffen said wall, and removable from said pocket through said opening to facilitate stowage of the parachute in said compartment.

8. In a personnel parachute pack, the combination comprising a U-shape case defining a compartment for stowing a parachute, and adapted to be supported in operative position with the upper end open and with legs depending, said case having front and rear flexible wall panels of substantial width and side walls of less width, one of said wall panels of substantial width having a pocket extending substantially across the full area of the latter wall panel and having an opening at the top, and a U-shaped stiffener adapted to be inserted in said pocket through said opening after the parachute has been stowed in said compartment to stiffen said wall and removable from said pocket through said opening to facilitate stowage of the parachute in said compartment.

9. In a personnel parachute pack of the type adapted to be supported on an aircraft seat and to serve as a back and heat rest for an airman in said seat, a U-shaped case defining a compartment for stowing a parachute and adapted to be supported in position on said seat with the upper end open and with the legs depending, said case having a front wall panel against which the airman's head is adapted to rest and a rear wall panel adapted to lie against the back of said seat, said front wall panel having a pocket extending substantially across the full area of said front wall panel and having an opening at the open end of said case, and a U-shaped stiffener adapted to be inserted in said pocket through said opening after the parachute has been stowed in said compartment to stiffen said front wall panel and removable from said pocket through said opening to facilitate stowage of the parachute in said compartment, said stiffener being dished slightly to cause the sides of said stiffener to recede rearwardly in position in said pocket, and presenting a concavity in its bridge portion between the limbs to receive the head of the airman in seat supported position of the pack.

10. In a personnel parachute pack, the combination comprising a case substantially preformed independently of any parachute therein and open at one end, said case having front, rear and side wall panels defining a compartment for stowing a main parachute, a container for stowing a spring-ejectable pilot chute for said main parachute comprising a base for seating said pilot chute in said container hinged along one side to one end of one of said wall panels at the open end of said case and adapted to be folded along its hinge connection across the top of said compartment, and flap means secured to said base for covering the pilot chute seated on said base and foldable back relative to said base to permit the pilot chute to be set in or deployed from said container, releasable locking means for holding the pilot chute in its container against the action of its spring, and flap means independently of said container flap means hinged to one or more of said wall panels at the open end of said case foldable over said container and adapted to protectively cover said locking means and said container.

11. In a personnel parachute pack, the combination as described in claim 10, comprising a conical seat secured to said base for a coil spring constituting the ejecting spring of the pilot chute.

12. In a personnel parachute pack, the combination as described in claim 10, wherein said case is U-shaped and is adapted to be supported in inverted position with the open end of the case at the top and with its two limbs depending from the top.

13. In a personnel parachute pack, the combination as described in claim 10, wherein said container flap means consists of four flaps coming together over the base in cruciform edge to edge relationship and each stitched along its outer edge to the base while its other sections are free to permit the flaps to be folded back for pack assembly and for deployment of the pilot chute therefrom.

14. In a personnel parachute pack, the combination comprising a case open at one end and defining a compartment for stowing a parachute, said case having laced side panels adjustable to permit expansion and contraction of said case to facilitate stowing of the parachute therein, a side cover hinged to each side of the case and adapted to be folded over the outside of the corresponding side panel in protective position to screen the lacing of the latter panel when said pack is in assembled condition, said side covers having end extensions forming side flaps adapted to be folded across the open end of said case in assembled condition of said pack, and means for releasably securing said side flaps across the open end in assembled condition of said pack with said covers held releasably in said protective positions.

15. In a personnel parachute pack, the combination comprising a case open at one end and defining a compartment for stowing a parachute, said case having laced side panels adjustable to permit expansion and contraction of said case to facilitate stowing of the parachute therein, a side cover hinged to each side of the case and adapted to be folded over the outside of the corresponding side panel in protective position to screen the lacing of the latter panel when said pack is in assembled condition, releasable means for holding said covers in said protective positions, said side covers having respective end extensions forming side flaps adapted to be folded across the open end of said case in assembled condition of the pack, and a pair of elastic straps each connected at one end to one part of the corresponding cover and at the other end to the corresponding side flap, the connection at one end of each strap being releasable.

16. In a parachute pack, the combination comprising a case open at one end and defining a compartment for stowing a parachute, said case having side panels with respective releasable connections therealong permitting said side panels to open up to facilitate stowing of the parachute in said case, a side cover hinged to each side of the case and adapted to be folded over the outside of the corresponding side panel in protective position to screen the releasable connection on the latter panel when said pack is in assembled condition, said side covers having end extensions forming side flaps adapted to be folded across the open end of said case in assembled condition of said pack, and means for releasably securing said side flaps across the open end in assembled condition of said pack, with said covers held releasably in said protective positions.

References Cited in the file of this patent

UNITED STATES PATENTS

| | | |
|---|---|---|
| 1,631,767 | Russell | June 7, 1927 |
| 1,712,309 | Russell | May 7, 1929 |
| 2,290,218 | Vosseller | July 21, 1942 |
| 2,299,408 | Quilter | Oct. 20, 1942 |
| 2,389,578 | Quilter | Nov. 20, 1945 |
| 2,413,368 | Neff | Dec. 31, 1946 |
| 2,495,505 | Quilter | Feb. 21, 1950 |
| 2,711,870 | Martin | June 28, 1955 |
| 2,762,588 | Martin | Sept. 11, 1956 |
| 2,922,604 | Hatfield | Jan. 26, 1960 |
| 2,940,702 | Martin | June 14, 1960 |

FOREIGN PATENTS

| | | |
|---|---|---|
| 649,569 | Germany | Aug. 25, 1937 |
| 799,346 | Great Britain | Aug. 6, 1958 |
| 1,085,768 | Germany | July 21, 1960 |